(12) United States Patent
Chen et al.

(10) Patent No.: US 11,490,470 B2
(45) Date of Patent: Nov. 1, 2022

(54) RADIO FREQUENCY DETECTION DEVICE AND DETECTION METHOD, AND MICROWAVE OVEN

(71) Applicants: GUANGDONG MIDEA KITCHEN APPLIANCES MANUFACTURING CO., LTD., Foshan (CN); MIDEA GROUP CO., LTD., Foshan (CN)

(72) Inventors: Likang Chen, Foshan (CN); Xiangwei Tang, Foshan (CN); Yang Deng, Foshan (CN); Tianhong Wu, Foshan (CN); Maoshun Chen, Foshan (CN); Zonglong Chen, Foshan (CN); Youping Fang, Foshan (CN)

( * ) Notice: Subject to any disclaimer, the term of this patent is extended or adjusted under 35 U.S.C. 154(b) by 451 days.

(21) Appl. No.: 16/627,322

(22) PCT Filed: Jan. 31, 2019

(86) PCT No.: PCT/CN2019/074232
§ 371 (c)(1),
(2) Date: Dec. 29, 2019

(87) PCT Pub. No.: WO2019/149251
PCT Pub. Date: Aug. 8, 2019

(65) Prior Publication Data
US 2020/0154533 A1    May 14, 2020

(30) Foreign Application Priority Data
Jan. 31, 2018    (CN) .......................... 201810098845.7

(51) Int. Cl.
*H05B 6/64*    (2006.01)
*G01S 13/88*    (2006.01)
*G01S 19/03*    (2010.01)

(52) U.S. Cl.
CPC ............ *H05B 6/6467* (2013.01); *G01S 13/88* (2013.01); *G01S 19/03* (2013.01)

(58) Field of Classification Search
CPC .. H05B 6/6402; H05B 6/6447; H05B 6/6452; H05B 6/6455; H05B 6/6458;
(Continued)

(56) References Cited

U.S. PATENT DOCUMENTS 6,452,141 B1    9/2002  Shon
2006/0006882 A1  1/2006  Tsuji
(Continued)

FOREIGN PATENT DOCUMENTS

CN    1867837 A    11/2006
CN    102262096 A    11/2011
(Continued)

OTHER PUBLICATIONS

The extended European search report of 19746729.3.
(Continued)

*Primary Examiner* — Hung D Nguyen
(74) *Attorney, Agent, or Firm* — Kilpatrick Townsend & Stockton, LLP (57) ABSTRACT

The present disclosure provides a radio frequency detecting device, a detecting method, and a microwave oven, and the radio frequency detecting device comprises: a signal transmitting device configured to generate and transmit multiple forward frequency detecting signals of different frequencies; a signal receiver configured to receive multiple reverse frequency detecting signals reflected by the load; a first detection device configured to detect each first parameter corresponding to each of the forward frequency detecting signals; a second detection device configured to detect each second parameter of each of the reverse frequency detecting signals; and a microcontroller configured to determine a (Continued)

state parameter of the load based on the multiple frequencies and the first parameter and the second parameter corresponding to each of the frequencies.

5 Claims, 6 Drawing Sheets

(58) Field of Classification Search
CPC ........ H05B 6/6467; H05B 6/664; H05B 6/68; H05B 6/686; H05B 6/70; H05B 6/705; H05B 6/72; G01S 19/03; G01S 13/38; G01S 13/56; G01S 13/88
USPC ....... 219/715, 716, 718, 721, 722, 745–747, 219/760, 761
See application file for complete search history.

(56) References Cited

U.S. PATENT DOCUMENTS

2015/0333781 A1* 11/2015 Alon ................ H04B 1/0475 370/310
2017/0127707 A1  5/2017 Li et al.

FOREIGN PATENT DOCUMENTS

| | | | |
|---|---|---|---|
| CN | 102495082 | A | 6/2012 |
| CN | 102721709 | A | 10/2012 |
| CN | 102735697 | A | 10/2012 |
| CN | 103078689 | A | 5/2013 |
| CN | 103630555 | A | 3/2014 |
| CN | 104202860 | A | 12/2014 |
| CN | 105423363 | A | 3/2016 |
| CN | 105698228 | A | 6/2016 |
| CN | 105974994 | A | 9/2016 |
| CN | 106102480 | A | 11/2016 |
| CN | 106322452 | A | 1/2017 |
| CN | 106464392 | A | 2/2017 |
| CN | 107559903 | A | 1/2018 |
| CN | 108333585 | A | 7/2018 |
| EP | 2453716 | A1 | 5/2012 |
| EP | 3131411 | A1 | 2/2017 |
| JP | 2006023239 | A | 1/2006 |
| JP | 2010256254 | A | 11/2010 |
| JP | WO2011004561 | A1 | 1/2011 |
| WO | 9726544 | A1 | 7/1997 |
| WO | 0030272 | A2 | 5/2000 |

OTHER PUBLICATIONS

The first Office Action dated Oct. 28, 2019 in the corresponding CN application No. 201810098845.7.
The first Search Report of CN application No. 201810098845.7. dated Oct. 16, 2019.
International Search Report dated Apr. 29, 2019 in the corresponding International Application No. PCT/CN2019/074232.

* cited by examiner

RADIO FREQUENCY DETECTION DEVICE AND DETECTION METHOD, AND MICROWAVE OVEN

CROSS-REFERENCES TO RELATED APPLICATIONS

The present disclosure is a national phase application of International Application No. PCT/CN2019/074232, filed on Jan. 31, 2019, which claims the priority of Chinese Application No. 201810098845.7, filed in the Chinese Patent Office on Jan. 31, 2018, the entireties of which are herein incorporated by reference.

FIELD

The present disclosure relates to the field of microwave oven technology, and in particular to a radio frequency detecting device, a radio frequency detecting method and a microwave oven.

BACKGROUND

For the detecting device or sensor used in the microwave oven, temperature detection, spectral detection, infrared detection, imaging detection, etc. are generally used; temperature detection may be in contact with the target, the cost of spectral detection is huge and the system is complex, infrared detection can only detect surface temperature and is susceptible to interference, imaging detection is sensitive to light color and difficult to identify, in addition, these detections have application scenarios, there is nothing that can be done beyond the scenarios.

SUMMARY

The present disclosure is intended to address at least one of the problems existing in the prior art or related art.

One embodiment of the present disclosure provides a radio frequency detecting device.

Another embodiment of the present disclosure provides a radio frequency detecting method.

Another embodiment of the present disclosure provides a microwave oven.

Embodiments of the present disclosure provides a radio frequency detecting device comprises: a signal transmitting device configured to sequentially generate and transmit multiple forward frequency detecting signals of different frequencies; a signal receiver configured to receive multiple reverse frequency detecting signals reflected by the load; a first detection device, connected to the signal transmitting device, the first detection device configured to detect each first parameter corresponding to each of the forward frequency detecting signals; a second detection device, connected to the signal receiver, the second detection device configured to detect each second parameter of each of the reverse frequency detecting signals; and a microcontroller configured to control the signal transmitting device to generate the multiple forward frequency detecting signals of different frequencies, the microcontroller is further configured to determine a state parameter of the load based on the multiple frequencies and the first parameter and the second parameter corresponding to each of the frequencies.

In one embodiment, the radio frequency detecting device is used to facilitate the detection of the load in various scenarios, to improve the adaptability of the detecting device to different scenarios; the radio frequency detecting device detects the load, does not need to contact with the load, improves the sanitation of the food load, reduces the possibility of changing or destroying the load state due to contact, and when detecting some dangerous loads, it can also reduce damage to the testing equipment or damage to personnel.

In one embodiment, in one embodiment, by setting a signal transmitting device, it is convenient to sequentially generate and transmit multiple forward frequency detecting signals of different frequencies to improve the possibility of detecting the load in various scenarios, and the detecting signals are not in contact with the load, improving the safety and hygiene of the load, as well as the safety of the testing equipment; through the setting of the signal receiver, it is convenient to receive the reverse frequency detecting signals reflected by the load; the signal transmitting device generates and transmits multiple signals of different frequencies, and obtains multiple reflected signals reflected by the load; each first parameter corresponding to each of the forward frequency detecting signals is detected by the first detection device, and each second parameter corresponding to each of the reverse frequency detecting signals is detected via the second detection device, and then after the calculation is performed by the microcontroller based on the multiple frequencies and the first parameter and the second parameter corresponding to each frequency, the specific information about the load can be obtained, after comparing with the pre-stored information, the state parameter of the type, volume, temperature, etc. of the load can be obtained, finally, the purpose of detecting the state parameter of the load without contact is achieved.

In one embodiment, the signal transmitting device comprises: a signal generation component configured to generate the forward frequency detecting signals; and a signal transmitter configured to transmit the forward frequency detecting signals.

In one embodiment, further, the signal transmitting device comprises a signal generation component and a signal transmitter, so that the signal generation component and the signal transmitter can work independently, reduce mutual interference, and facilitate the connection between the two components and other components to realize more functions.

In one embodiment, the signal transmitter and the signal receiver share a same antenna; the radio frequency detecting device further comprise: a power separation device, connected to the signal generation component, the antenna, the first detection device, and the second detection device, and a first terminal of the power separation device is connected to the antenna, a second terminal of the power separation device is connected to the first detection device, the third terminal of the power separation device is connected to the second detection device, and the fourth terminal of the power separation device is connected to the signal generation component.

In one embodiment, the signal transmitter and the signal receiver share a same antenna, which simplifies the structure, saves space, and facilitates expanding the application range and application scenarios of the radio frequency detecting device; further, the power separation device is set in the radio frequency detecting device, and a first terminal of the power separation device is connected to the antenna, a second terminal of the power separation device is connected to the first detection device, and the third terminal of the power separation device is connected to the second detection device, and the fourth terminal of the power separation device is connected to the signal generation component, so that when the forward frequency detecting signals are transmitted, the forward frequency detecting signals can be divided into two after entering the power separation device through the fourth terminal, and flow out from the first terminal and the second terminal, that is, flow through the first terminal to the antenna to transmit the forward frequency detecting signals to the load, starts detecting the load, and also flows to the first detection device through the second terminal, so that the first detection device will convert the forward frequency detecting signals into the forward analog voltage, to obtain the forward voltage of the forward frequency detecting signals, that is, the first parameter of the forward frequency detecting signals; on the other hand, when the antenna receives the reverse frequency detecting signals reflected by the load, the reverse frequency detecting signals can be divided into two after entering the power separation device through a first terminal, and flow out from the third terminal and the fourth terminal, that is, flow through the third terminal to the second detection device, so that the second detection device will convert the reverse frequency detecting signals into the reverse analog voltage, to obtain the reverse voltage of the reverse frequency detecting signals, that is, the second parameter of the reverse frequency detecting signals; by acquiring multiple frequencies and the forward voltage and the reverse voltage corresponding to each of the frequencies, specific information about the load can be obtained after calculation, and after comparing with the pre-stored information, the state parameter of the type, volume, temperature, etc. of the load can be obtained, finally, the purpose of detecting the state parameter of the load without contact is achieved. It should be noted that through the setting of the power separation device, the separation and independent detection of the transmitted forward frequency detecting signals and the reflected reverse frequency detecting signals are also realized, and the detection accuracy is improved.

In one embodiment, a power amplification device is disposed between the fourth terminal of the power separation device and the signal generation component, the fourth terminal is connected to the signal generation component via the power amplification device, and the power amplification device is configured to amplify the forward frequency detecting signals, is disclosed.

In one embodiment, by setting the power amplification device between the fourth terminal of the power separation device and the signal generation component, it is convenient to amplify the forward frequency detecting signals generated by the signal generation component, so that the forward frequency detecting signals transmitted by the antenna to the load is amplified accordingly, which improves the sensitivity of the detecting; the isolation between the power separation device and the signal generation component is also increased, when the antenna receives the reflected reverse frequency detecting signals, and through the fourth terminal of the power separation device flow to the signal generation component, the reverse frequency detecting signals can be absorbed by the power amplification device, reduces the possibility of the signal generation component being impacted, improves the security of the signal generation component, extends the service life of the radio frequency detecting device, and reduces the use cost; similarly, the power separation device is set between the antenna and the power amplification device, which also increases the isolation between the antenna and the power amplification device, reduces the possibility that a high-power signal is poured into the power amplification device while the device is working, causing the power amplification device to be burned.

In one embodiment, the power amplification device comprises: a first capacitor, one end of which is connected to the signal generation device; an amplifier, one end of which is connected to the other end of the first capacitor; and a second capacitor, one end of which is connected to the other end of the amplifier, and the other end of the second capacitor is connected to the fourth terminal of the power separation device.

In one embodiment, by setting the first capacitor and the second capacitor and the amplifier, it is convenient to amplify the forward frequency detecting signals when the forward frequency detecting signals pass through the power amplification device; when the reverse frequency detecting signals pass through the power amplification device, they are absorbed.

In one embodiment, at least one PI internet, disposed between the signal generation component and the power amplification device, the PI internet is configured to adjust the size of the forward frequency detecting signals or the reverse frequency detecting signals, and is further configured to increase the isolation of the circuit at both ends thereof is disclosed.

In one embodiment, by setting the PI network between the signal generation component and the power amplification device, the size of the forward frequency detecting signals can be adjusted, the isolation between the signal generation component and the power amplification device is increased, and the safety of the circuit is improved.

In one embodiment, at least one PI internet is disposed between the first detection device and a second terminal of the power separation device, the PI internet is configured to adjust the size of the forward frequency detecting signals or the reverse frequency detecting signals, and is further configured to increase the isolation of the circuit at both ends thereof, is described.

In one embodiment, by setting the PI network between the first detection device and a second terminal of the power separation device, the size of the forward frequency detecting signals can be adjusted, and the isolation between the first detection device and the power separation device is increased, the safety of the circuit is improved.

In one embodiment, at least one PI internet is disposed between the second detection device and the third terminal of the power separation device, the PI internet is configured to adjust the size of the forward frequency detecting signals or the reverse frequency detecting signals, and is further configured to increase the isolation of the circuit at both ends thereof, is described.

In one embodiment, by setting a PI network between the second detection device and the third terminal of the power separation device, the size of the reverse frequency detecting signals can be adjusted, and the isolation between the second detection device and the power separation device is increased, the safety of the circuit is improved.

In one embodiment, when setting the PI network in the above three locations at the same time, the size of the forward frequency detecting signals and the reverse frequency detecting signals, and the isolation of the entire circuit can be more flexibly adjusted to adapt to more different scenarios and different loads, and increases the overall safety of the radio frequency detecting device and extends the service life of the radio frequency detecting device.

Embodiments of the present disclosure provides a radio frequency detecting method, configured to use the radio frequency detecting device of any one of the embodiments, comprises the signal transmitting device sequentially generates multiple forward frequency detecting signals of different frequencies based on control signals sent by the microcontroller; transmitting the multiple forward frequency detecting signals to the load by the signal transmitting device, and detecting each first parameter corresponding to each of the forward frequency detecting signals by the first detection device; receiving multiple reverse frequency detecting signals reflected by the load via the signal receiver; detecting each second parameter of each of the reverse frequency detecting signals via the second detection device; and determining the state parameter of the load based on the multiple frequencies and the first parameter and the second parameter corresponding to each of the frequencies via the microcontroller.

In one embodiment, the signal transmitting device receives the control signals sent by the microcontroller, it is convenient to sequentially generate and transmit multiple forward frequency detecting signals of different frequencies to improve the possibility of detecting the load in various scenarios, and the detecting signals are not in contact with the load, improving the safety and hygiene of the load; and based on the control signals sent by the microcontroller, the frequency of the forward frequency detecting signals sequentially transmitted can be matched with the preset frequencies, which is convenient for later data processing and comparison, and improves work efficiency and detection accuracy; transmitting the multiple forward frequency detecting signals to the load by the signal transmitting device, and detecting each first parameter corresponding to each of the forward frequency detecting signals by the first detection device, and receiving the multiple reverse frequency detecting signals reflected by the load via the signal receiver, and detecting each second parameter of each of the reverse frequency detecting signals via the second detection device, to obtain the first parameter and the second parameter corresponding to each of the frequencies, and then after the calculation is performed by the microcontroller based on the multiple frequencies and the first parameter and the second parameter corresponding to each frequency, the specific information about the load can be obtained, after comparing with the pre-stored information, the state parameter of the type, volume, temperature, etc. of the load can be obtained, finally, the purpose of detecting the state parameter of the load without contact is achieved.

In one embodiment, the first parameter is the forward analog voltage of the forward frequency detecting signals; the second parameter is the reverse analog voltage of the reverse frequency detecting signals.

Embodiments of the present disclosure include determining the state parameter of the load comprises: determining a standing wave corresponding to each of the frequencies based on the first parameter and the second parameter corresponding to each of the frequencies; determining a frequency-standing wave relationship map based on the multiple frequencies and the standing wave corresponding to each of the frequencies; comparing the frequency-standing wave relationship map with a pre-stored map associated with the state parameter of the load, and determining a preset map corresponding to the frequency-standing wave relationship map; and determining the state parameter of the load based on the preset map.

In one embodiment, the standing wave corresponding to each frequency is determined by the first parameter and the second parameter corresponding to each frequency, so that the two parameters are integrated into one specific parameter related to the load state at a specific frequency through an operation rule, reduce the number of parameters, simplify the judgment criteria, and reduce the difficulty of subsequent operations; the frequency-standing wave relationship map is determined by multiple frequencies and standing waves corresponding to each frequency, and the frequency-standing wave relationship map is compared with the pre-stored map associated with the state parameter of the load to determine the preset map corresponding to the frequency-standing wave relationship map and the complex calculations are changed to graphical comparisons, reduces the possibility of the detection result being wrong due to the calculation error, and makes the detection and judgment of the load state parameter become intuitive and simple, and improves the detection speed and accuracy of detection.

It should be noted that according to the preset map, determining the state parameters of the load is based on the premise that a large and accurate maps library needs to be established, that is, the final implementation of the method requires first, it is necessary to detect different state parameters of various loads, and perform radio frequency scanning under the state parameters to obtain a preset map of a specific load in a specific state, that is, detecting and determining a preset map corresponding to a specific state parameter of the specific load, and how many different state parameters for each load, there will be a corresponding number of preset map, and the load is different, so the above-mentioned preset map library corresponding to different state parameters of various loads is established, and the state parameters of the load are determined according to the preset map, so that the detection of the state parameters of the load can be achieved, and improve the speed and accuracy of the detection, and moreover, it does not directly contact the load, which improves the hygiene and safety of the load.

One embodiment of the present disclosure provides a microwave oven, comprises the radio frequency detecting device of any one of the above aspects, and the number of the radio frequency detecting devices is at least one.

One embodiment of the present disclosure include obtaining via the radio frequency detecting device of any one of the above embodiments, and details are not described herein again.

It should be noted that when the multiple above-mentioned radio frequency detecting devices are used in a microwave oven, and the multiple radio frequency detecting devices are dispersedly disposed, the multiple detecting signals of different frequencies can be simultaneously transmitted from multiple angles, to improve the detecting speed and accuracy of detection and improved work efficiency.

The corresponding relationship between the reference signs and component names in FIG. 1 to FIG. 8 are as follows:

10 antenna, 20 power separation device, 21 a first terminal, 22 a second terminal, 23 a third terminal, 24 a fourth terminal, 30 a first detection circuit, 300 a positive detector tube, 40 a second detection circuit, 400 a reverse detection tube, 50 a power amplification device, 500 an amplifier, 60 a signal generation component, 600 an oscillator.

DETAILED DESCRIPTION OF THE DISCLOSURE

Embodiments of the present disclosure can be understood more clearly, a further detailed description of the present disclosure will be given below in connection with the accompanying drawings and specific embodiments.

In the following description, numerous specific details are set forth in order to provide a thorough understanding of the present disclosure. However, the present disclosure can also be implemented in other manners than those described herein. Therefore, the protection scope of the present disclosure is not limited to the specific embodiments disclosed below.

Some embodiments according to the present disclosure are described below with reference to FIG. 1 to FIG. 8.

Embodiment 1

Figure 1:
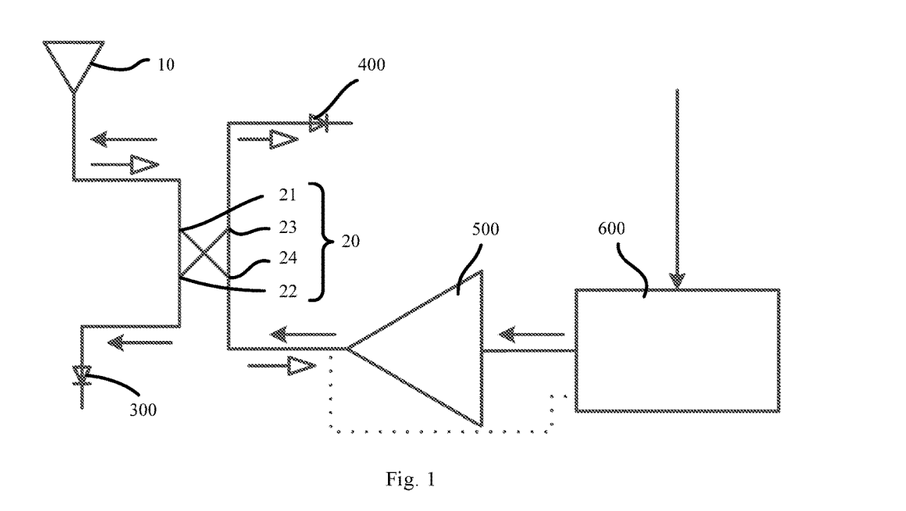
FIG. 1 shows a working principle diagram of the radio frequency detecting device according to an embodiment of the present disclosure.

FIG. 1 shows a working principle diagram of the radio frequency detecting device according to an embodiment of the present disclosure.

Figure 3:
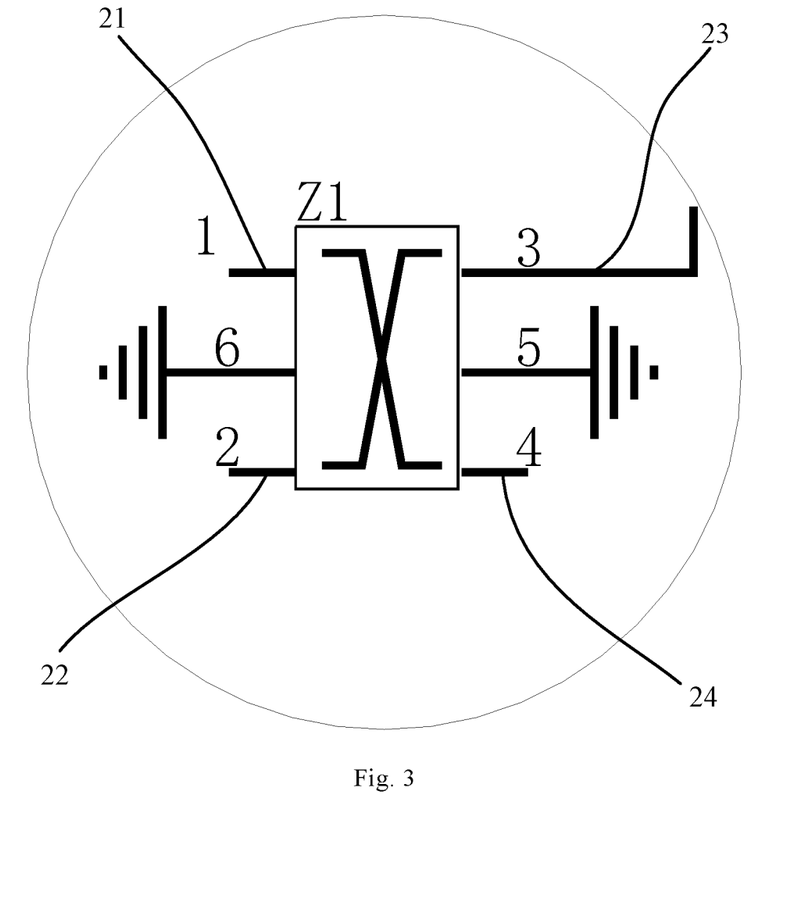
FIG. 3 shows an enlarged schematic view of the power separation device 20 of FIG. 2.

As shown in FIG. 1, the radio frequency detecting device mainly comprises an antenna 10, a power separation device 20, a positive detector tube 300, and a reverse detection tube 400, and an amplifier 500 and an oscillator 600, and the antenna 10 is configured to transmit forward detecting signals and receive reflected reverse detecting signals. As shown in FIG. 1 and FIG. 3, the power separation device 20 can be a bridge or a coupler, the power separation device 20 is disposed between the antenna 10, the amplifier 500, the positive detector tube 300 and the reverse detection tube 400, and the power separation device 20 has four terminals, a first terminal 21 of the power separation device 20 is connected to the antenna 10, a second terminal 22 is connected to the positive detector tube 300, the third terminal 23 is connected to the reverse detection tube 400, the fourth terminal 24 is connected to the amplifier 500, and the amplifier 500 is connected to the voltage controlled oscillator. The power separation device 20 is configured to separate the forward detecting signals and the reverse detecting signals, and increase the isolation between the antenna 10 and the amplifier 500; the amplifier 500 is configured to amplify the forward detecting signals and absorb the reverse detecting signals; the positive detector tube 300 is configured to convert the forward detecting signals into an analog voltage to obtain a forward voltage of the forward detecting signals; the reverse detection tube 400 is configured to convert the reflected reverse detecting signals into a reverse analog voltage to obtain a reverse voltage of the reverse detecting signals.

In one embodiment, when the radio frequency detecting device starts to work, as shown by the solid arrow in FIG. 1, the forward frequency detecting signals at a specific frequency f0 are generated by the oscillator 600 according to the control signals sent by the microcontroller, and the forward frequency detecting signals are sent to the amplifier 500, amplified by the amplifier 500, and then input to the fourth terminal 24 of the power separation device 20; in the power separation device 20, the forward frequency detecting signals are divided into two parts by the power separation device 20, that is, the forward frequency detecting signals are divided into two parts of equal power, and the power of each part is half of the original forward frequency detecting signals. The two-part forward frequency detecting signals are output from a first terminal 21 and a second terminal 22 of the power separation device 20, and the forward frequency detecting signals outputted by a first terminal 21 are input into the antenna 10, and are transmitted to the load via the antenna 10; the forward frequency detecting signals outputted by the second terminal 22 are input to the positive detector tube 300, and after being converted into an analog voltage, the forward voltage Vout of the transmitted forward frequency detecting signals are obtained.

Similarly, as shown by the hollow arrow in FIG. 1, after the forward frequency detecting signals transmitted by the antenna 10 are sent to the load, they are reflected back by the load to form the reverse frequency detecting signals, which are received by the antenna 10, after receiving by the antenna 10, the reverse frequency detecting signals are sent to a first terminal 21 of the power separation device 20, and the reverse frequency detecting signals are also divided into two parts by the power separation device 20, and the two parts of the reverse frequency detecting signals are respectively through the third terminal 23 and the four terminal 24 of the power separation device 20 output to the reverse detection tube 400 and the amplifier 500, and the reverse frequency detecting signals entering the reverse detection tube 400 are converted into an analog voltage, and the forward voltage Vref of the reverse frequency detecting signals are obtained, and the power of the reverse frequency detecting signals entering the amplifier 500 are absorbed by the amplifier 500, reducing the impact on the voltage controlled oscillator.

After determining the forward voltage and the reverse voltage, the calculation is performed by the microcontroller, and the standing wave SWR=F (Vref, Vout) corresponding to the specific frequency f0 is obtained.

The radio frequency detecting device continues to work, and the forward frequency detecting signals at different frequencies are generated in sequence to perform frequency sweeping, so that a standing wave corresponding to each frequency of the multiple frequencies can be obtained, that is, multiple frequencies and corresponding multiple standing wave are obtained, so that the function diagram y=F (fi, SWR) of the frequency-standing wave can be obtained.

In the database of the microcontroller, a preset map of multiple frequency-standing waves is pre-stored, and each preset map corresponds to a specific state parameter of the load at a specific frequency, therefore, the function diagram of the frequency-standing wave obtained by the radio frequency detecting device by sweeping is compared with the preset map in the database, and after finding the corresponding preset map, the state parameter of the load corresponding thereto can be determined according to the preset map, complete the detection of the status parameters of the load without touching the load.

When the radio frequency detecting device of the present disclosure is applied to a microwave oven, the temperature and volume of the load in the microwave oven can be detected, and the no-load condition can also be detected.

Figure 4:
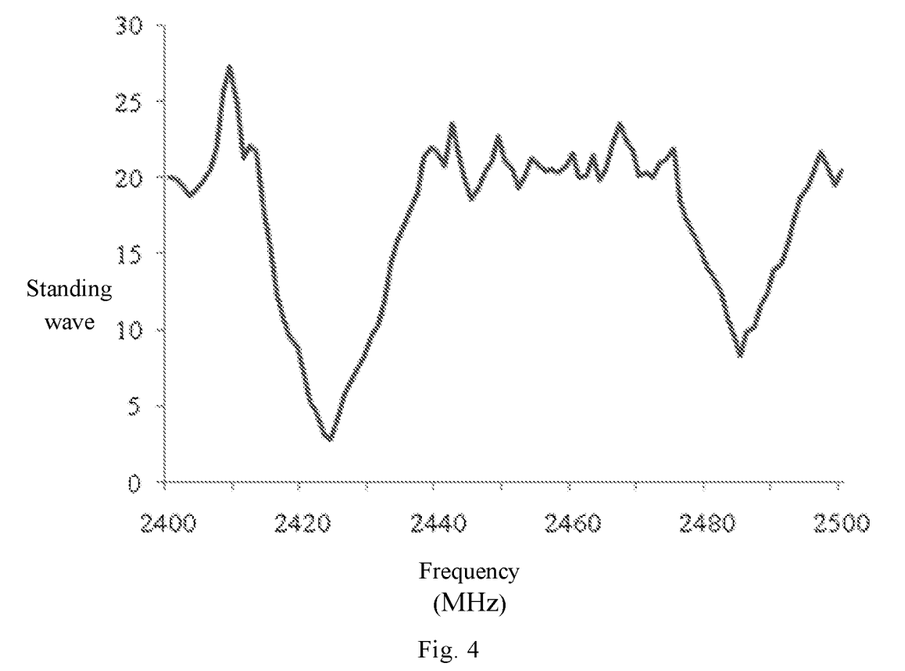
FIG. 4 shows a function diagram of a frequency-standing wave obtained by scanning with the radio frequency detecting device of the embodiment when the load of the microwave oven is empty according to an embodiment of the present disclosure.
Figure 5:
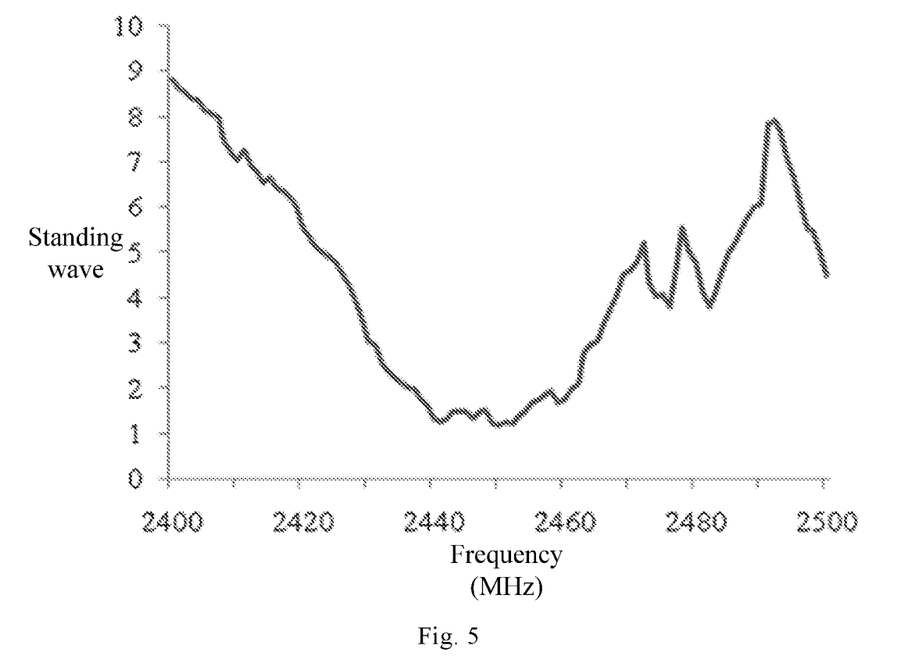
FIG. 5 shows a function diagram of a frequency-standing wave obtained by scanning with the radio frequency detecting device of the embodiment when the load in the microwave oven is 250 ml 4° C. packaged milk according to an embodiment of the present disclosure.
Figure 6:
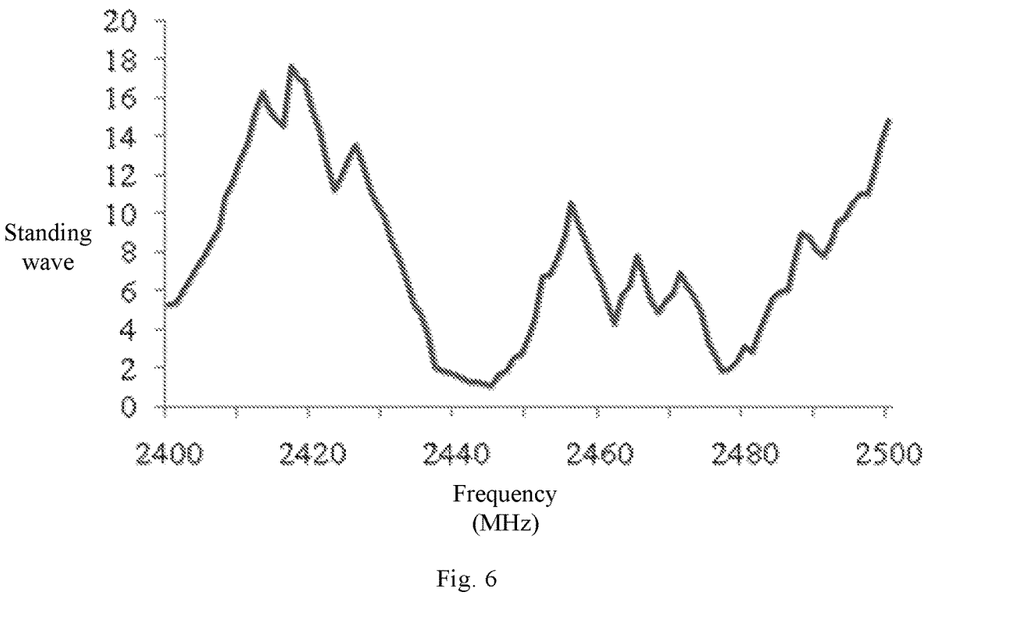
FIG. 6 shows a function diagram of a frequency-standing wave obtained by scanning with the radio frequency detecting device of the embodiment when the load in the microwave oven is 250 ml 4° C. packaged milk according to an embodiment of the present disclosure.

In one embodiment, for example, in a microwave oven, the radio frequency detecting device of the present disclosure is employed. As shown in FIG. 4, FIG. 5, and FIG. 6, FIG. 4 shows a function diagram of a frequency-standing wave when the microwave oven is unloaded; FIG. 5 shows a function diagram of the frequency-standing wave of packaged milk with a load of 250 ml 4° C. in a microwave oven; FIG. 6 shows a function diagram of the frequency-standing wave of packaged milk with a load of 250 ml 4° C. in a microwave oven; put these diagrams into the pre-stored library, when using the microwave oven, the function map of the frequency-standing wave detected by the radio frequency detecting device is the same as that of FIG. 5, it can be determined that the load in the microwave oven is packaged milk, it is 250 ml and the temperature is 4° C.

Figure 2:
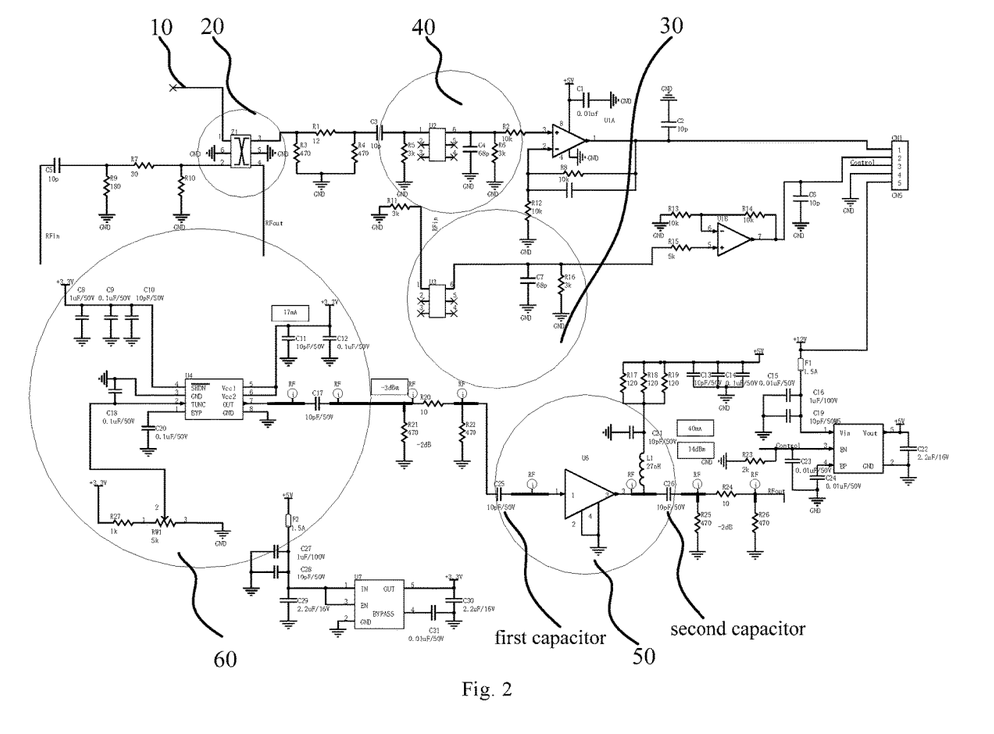
FIG. 2 shows a schematic diagram of the circuit structure of the radio frequency detecting device according to an embodiment of the present disclosure.

In one embodiment, the radio frequency detecting device according to an embodiment of the present disclosure, as shown in FIG. 2, comprises:

a microcontroller and a signal generation component 60, the microcontroller is configured to send control signals to the signal generation component 60 based on the preset frequency range, so that the signal generation component 60 sequentially generates multiple forward frequency detecting signals corresponding to multiple frequencies in the preset frequency range.

The signal generation component 60 is connected to the power amplification device 50, and the other end of the power amplification device 50 is connected to the power separation device 20; the power separation device 20 comprises a directional coupler having six terminals, as shown in FIG. 3, both terminals of the directional coupler are grounded, and the fourth terminal 24 of the other four terminals is connected to the other end of the power amplification device 50; the radio frequency detecting device of this embodiment further comprises an antenna 10, and a first detection device and a second detection device, and the antenna 10 is connected to a first terminal 21 of the directional coupler, and the first detection device is connected to the second terminal 22 of the directional coupler, the second detection device is connected to the third terminal 23 of the directional coupler. The antenna 10 is configured to transmit forward frequency detecting signals generated by the signal generation component 60 and reverse frequency detecting signals reflected by the load.

The power separation device 20 can be a directional coupler, or a bridge, or other similar functional circuit structure or electrical component.

Further, between the first detection device and the directional coupler, between the second detection device and the directional coupler, and between the signal generation component 60 and the power amplification device 50, a PI internet is provided to adjust the size of the forward frequency detecting signals or the reverse frequency detecting signals, and increase the isolation between circuits to improve the overall security of the circuit; at the same time, the PI network is disposed in each of the above three positions, and the size of the forward frequency detecting signals and the reverse frequency detecting signals, and the isolation of the entire circuit can be more flexibly adjusted to adapt to more different scenarios and different loads, and improve the overall safety of the radio frequency detecting device and extends the service life of the radio frequency detecting device. Of course, the PI network can also be set only at one or two of the above three locations according to specific needs.

More In one embodiment, in the signal generation component 60, comprises an oscillator 600, the oscillator 600 includes multiple terminals and multiple capacitors, the multiple capacitors being at least divided into two groups, and one end of each capacitor in each group is commonly connected to one terminal or two terminals of the oscillator 600, and the other end of each capacitor is grounded. By setting the signal generation component 60, it is convenient to flexibly generate the forward frequency detecting signals of different frequencies. In this embodiment, the oscillator 600 may use a voltage controlled oscillator to save cost and simplify the structure; the oscillator 600 can also be selected from other crystal oscillators and the like.

In the power amplification device 50 of this embodiment, comprises: a first capacitor, and one end of the first capacitor is connected to the signal generation component 60; an amplifier 500, one end of the amplifier 500 is connected to the other end of the first capacitor; and an second capacitor, one end of the second capacitor is connected to the other end of the amplifier 500, and the other end of the second capacitor is connected to the fourth terminal 24 of the directional coupler. By setting the power amplification device 50, it is convenient to amplify the forward frequency detecting signals generated by the signal generation component 60, so that the forward frequency detecting signals transmitted by the antenna 10 to the load is amplified accordingly, to improve the sensitivity of the detecting; the power amplification device 50 also increases the isolation between the power separation device 20 and the signal generation component 60, when the antenna 10 receives the reflected reverse frequency detecting signals, and through the fourth terminal 24 of the directional coupler flow to the signal generation component 60, the reverse frequency detecting signals can be absorbed by the power amplification device 50, reduces the possibility of the signal generation component 60 being impacted, improves the security of the signal generation component 60, extends the service life of the radio frequency detecting device, and reduces the use cost; and the power separation device 20 also increases the isolation between the power amplification device 50 and the antenna 10, reduces the possibility that the high-power signal received by the antenna 10 is poured into the power amplification device 50 to cause damage.

The first detection device of the embodiment comprises a first detecting circuit 30 and a first computing component, the first detecting circuit 30 includes a detecting chip, and a first resistor and a third capacitor respectively connected to the detecting chip, and the end of the first resistor and the third capacitor that are not connected to the detecting chip are grounded, and the end of the third capacitor connected to the detecting chip is further connected with the second resistor, and one end of the second resistor connected to the third capacitor is connected to the first computing component, and the other end of the second resistor is grounded. The first detection circuit 30 is configured to convert the forward frequency detecting signals into a forward analog voltage to obtain the forward voltage of the forward frequency detecting signals by sampling by the first computing component.

The second detection device includes a second detecting circuit 40 and a second computing component, and the second detecting circuit 40 has the same structure as the first detecting circuit 30, and the second detecting circuit 40 is configured to convert the reverse frequency detecting signals reflected by the load into a reverse analog voltage to obtain the reverse voltage of the reverse frequency detecting signals by sampling via the second computing component.

After obtaining the forward voltage of the forward frequency detecting signals and the reverse voltage of the reverse frequency detecting signals at the specific frequency, a standing wave corresponding to the frequency can be calculated; according to the preset frequency range, after performing frequency sweeping, the standing wave corresponding to each frequency in the preset frequency range can be obtained, to obtain the frequency-standing wave function relationship map and comparing the frequency-standing wave relationship map with the pre-stored map associated with the state parameter of the load by the microcontroller, and determining a preset map corresponding to the frequency-standing wave relationship map; and determining the state parameter of the load based on the preset map, achieve detection of load. The state parameters of the load include temperature, volume, etc.

The radio frequency detecting device of the embodiment is convenient for detecting the state of various loads without contact, to improve the convenience and safety of the detection, and reducing the possibility of damage and failure of the load due to contact detection, and also reducing the possibility of detection of dangerous loads causing damage to the instrument or injury to the tester, such as high temperature objects; moreover, the radio frequency detecting device of the embodiment has a simple structure and low cost; in the process of testing, the complex calculations are changed to graphical comparisons, which are simple and intuitive, and improve work efficiency.

Embodiment 2

The radio frequency detecting device according to another embodiment of the present disclosure is different from embodiment 1 in that the power separation device 20 and the power amplification device 50 are not used, and the signals are transmitted and received by the signal transmitter and the signal receiver respectively, particularly, the radio frequency detecting device of the embodiment includes a microcontroller, a signal transmitting device, a signal receiver, a first detection device and a second detection device. The signal transmitting device sequentially generates and transmits multiple forward frequency detecting signals of different frequencies according to the control signals of the microcontroller, and after detecting the forward voltage by the first detection device, the signals are sent from the signal transmitter of the signal transmitting device, and after the signals are reflected by the load, the signal receiver receives the reflected reverse detecting signals, the second detection device is connected to the signal receiver, so that the reverse voltage of the reverse frequency detecting signals can be detected; the first detection device and the second detection device are both connected to the microcontroller, so that the detected forward voltage and reverse voltage are fed back to the microcontroller, so that the frequency-standing wave function of the load can be obtained through the operation of the microcontroller, after the comparison and retrieval, the preset map and the state parameters of the load associated with the preset map are obtained, to realize the detection of the load state.

Of course, the power amplification device 50 may not reduce, but increase the number thereof, to obtain a better detection dynamic range and improving the sensitivity of the detection.

In this embodiment, an auxiliary circuit such as a temperature compensation circuit can be added according to specific application scenarios and device to obtain more and more targeted functions.

Embodiment 3

Figure 7:
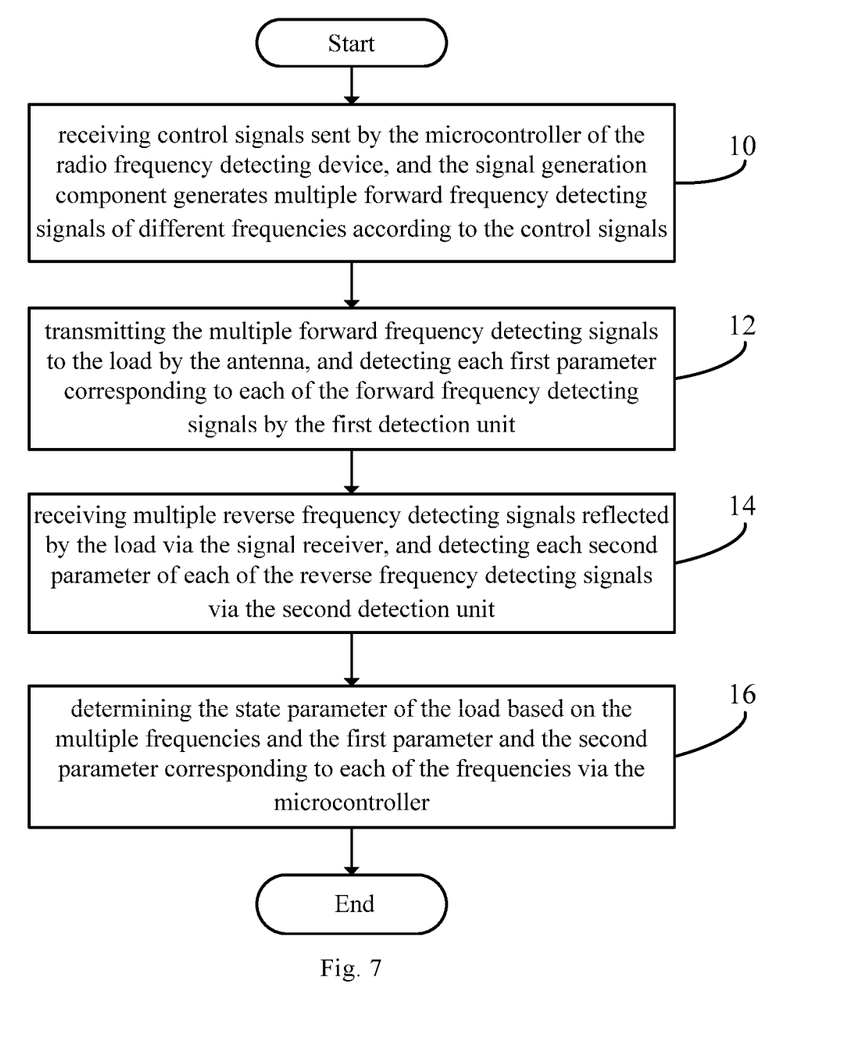
FIG. 7 shows a flow chart of the radio frequency detecting method according to an embodiment of the present disclosure.

As shown in FIG. 7, the radio frequency detecting method according to an embodiment of the present disclosure is configured as the radio frequency detecting device of any one of the foregoing embodiments, and In one embodiment includes the following steps:

Step 10: receiving control signals sent by the microcontroller of the radio frequency detecting device, and the signal generation component generates multiple forward frequency detecting signals of different frequencies according to the control signals;

Step 12: transmitting the multiple forward frequency detecting signals to the load by the antenna, and detecting each first parameter corresponding to each of the forward frequency detecting signals by the first detection device;

Step 14: receiving multiple reverse frequency detecting signals reflected by the load via the signal receiver, and detecting each second parameter of each of the reverse frequency detecting signals via the second detection device; and Step 16: determining the state parameter of the load based on the multiple frequencies and the first parameter and the second parameter corresponding to each of the frequencies via the microcontroller.

The signal generation device receives the control signals sent by the microcontroller, it is convenient to sequentially generate and transmit multiple forward frequency detecting signals of different frequencies to improve the possibility of detecting the load in various scenarios, and the detecting signals are not in contact with the load, improving the safety and hygiene of the load; and based on the control signals sent by the microcontroller, the frequencies of the forward frequency detecting signals sequentially transmitted can be matched with the preset frequencies, which is convenient for later data processing and comparison, and improves work efficiency and detection accuracy; transmitting the multiple forward frequency detecting signals to the load by the signal transmitting device, and detecting each first parameter corresponding to each of the forward frequency detecting signals by the first detection device, and receiving the multiple reverse frequency detecting signals reflected by the load via the signal receiver, and detecting each second parameter of each of the reverse frequency detecting signals via the second detection device, to obtain the first parameter and the second parameter corresponding to each of the frequencies, and then after the calculation is performed by the microcontroller based on the multiple frequencies and the first parameter and the second parameter corresponding to each frequency, the specific information about the load can be obtained, after comparing with the pre-stored information, the state parameter of the type, volume, temperature, etc. of the load can be obtained, finally, the purpose of detecting the state parameter of the load without contact is achieved.

The first parameter and the second parameter may be voltage, current, or power, and are flexibly selected according to actual application scenarios, to improve detection convenience and detection efficiency.

Embodiment 4

Figure 8:
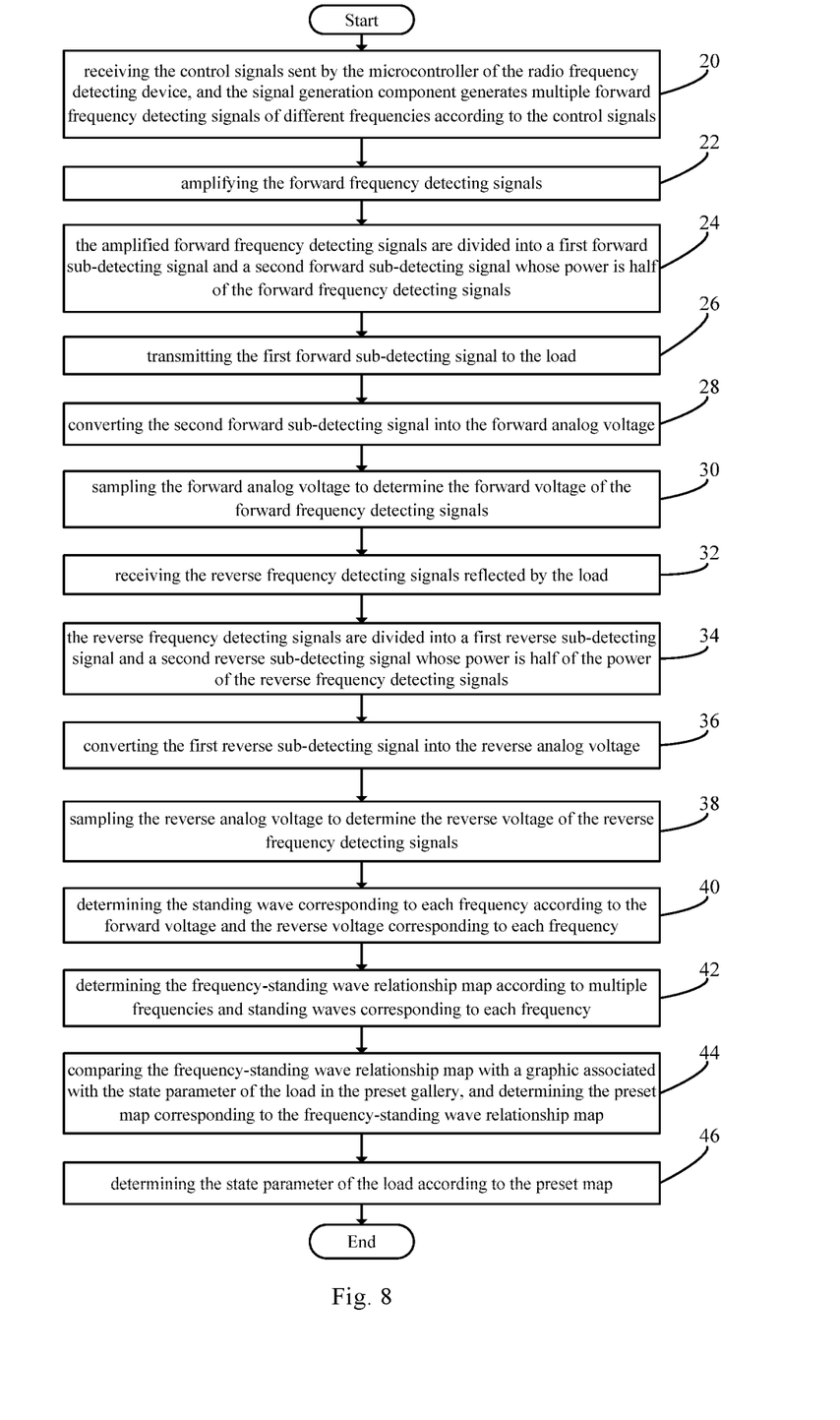
FIG. 8 shows a flow chart of the radio frequency detecting method according to another embodiment of the present disclosure.

As shown in FIG. 8, the radio frequency detecting method according to an embodiment of the present disclosure is configured as the radio frequency detecting device of any one of the foregoing embodiments, and In one embodiment includes the following steps:

Step 20: receiving the control signals sent by the microcontroller of the radio frequency detecting device, and the signal generation component generates multiple forward frequency detecting signals of different frequencies according to the control signals;

Step 22: amplifying the forward frequency detecting signals;

by amplifying the forward frequency detecting signals, it is easy to enhance the signals and improve the sensitivity of the detection.

Step 24: the amplified forward frequency detecting signals are divided into a first forward sub-detecting signal and a second forward sub-detecting signal whose power is half of the forward frequency detecting signals;

the two-power splitting of the forward frequency detecting signals facilitate reducing the power of the signals, reducing the impact on the electrical detection components, and extending the service life of the radio frequency detecting device.

Step 26: transmitting the first forward sub-detecting signal to the load;

Step 28: converting the second forward sub-detecting signal into the forward analog voltage;

Step 30: sampling the forward analog voltage to determine the forward voltage of the forward frequency detecting signals;

using the voltage as the first parameter facilitates improving the sensitivity of the detection and the convenience of detection, as well as the accuracy of the detection.

Step 32: receiving the reverse frequency detecting signals reflected by the load;

Step 34: the reverse frequency detecting signals are divided into a first reverse sub-detecting signal and a second reverse sub-detecting signal whose power is half of the power of the reverse frequency detecting signals;

Step 36: converting the first reverse sub-detecting signal into the reverse analog voltage;

Step 38: sampling the reverse analog voltage to determine the reverse voltage of the reverse frequency detecting signals;

Step 40: determining the standing wave corresponding to each frequency according to the forward voltage and the reverse voltage corresponding to each frequency;

calculating the standing wave corresponding to the forward voltage and the reverse voltage, the two parameters corresponding to each frequency are simplified into one parameter, to simplify the judgment standard and reducing the difficulty of subsequent operations.

Step 42: determining the frequency-standing wave relationship map according to multiple frequencies and standing waves corresponding to each frequency;

Step 44: comparing the frequency-standing wave relationship map with a graphic associated with the state parameter of the load in the preset gallery, and determining the preset map corresponding to the frequency-standing wave relationship map;

Step 46: determining the state parameter of the load according to the preset map.

By transforming the internal connection of the frequency-standing wave into a functional relationship map, the complex calculation process is converted into a graphical comparison, which reduces the possibility of detection result errors due to calculation errors, and the detection and judgment of the load state parameter are made intuitive and simple, the detection speed and the detection accuracy are improved, and the radio frequency detecting method of the embodiment does not need to be in contact with the load, and the judging process is quick and simple, to reduce the possibility of damage and failure of the load due to contact detection.

Embodiment 5

A microwave oven according to an embodiment of the present disclosure employs the radio frequency detecting device of any of the above embodiments.

It should be noted that the radio frequency detecting device of the present disclosure has a simple structure and has no influence on matching, and can be applied to various high-medium and low-end microwave ovens, and can also be used in equipment such as an oven, a rice cooker, and a steamer.

Embodiments of the present disclosure is described in detail above with reference to the accompanying drawings. Embodiments of the present disclosure, the purpose of detecting the state parameter of the load without contacting the load is effectively realized, the convenience and safety of the detection are improved, and reducing the possibility of damage and failure of the load due to contact detection, and also reducing the possibility of detection of dangerous loads causing damage to the instrument or injury to the tester, such as high temperature objects; and the radio frequency detecting device of the present disclosure has a simple structure and low cost; in the process of testing, the complex calculations are changed to graphical comparisons, which are simple and intuitive, and improve work efficiency.

In the present disclosure, the terms "first", "second", and "third" are used for the purpose of description only, and cannot be understood as indicating or implying relative importance; the term "multiple" means two or more, unless otherwise explicitly defined. The terms "mounting", "connected", "connection", "fixing" and the like should be understood in a broad sense. For example, "connection" may be a fixed connection, a removable connection or an integral connection; the term "connected" may refer to being directly connected and may also refer to being indirectly connected through an intermediary.

In the description of the present disclosure, it should be understood that the orientation or position relationships indicated by the terms "upper", "lower", "left", "right", "front", "back" and the like are the orientation or position relationships based on what is shown in the drawings, are merely for the convenience of describing the present disclosure and simplifying the description, and do not indicate or imply that the device or device referred to may have a particular direction and is constructed and operated in a specific orientation, and thus cannot be understood as the limitation of the present disclosure.

In the description of the present specification, the descriptions of the terms "one embodiment", "some embodiments" and "specific embodiments" and the like mean that specific features, structures, materials or characteristics described in conjunction with the embodiment(s) or example(s) are included in at least one embodiment or example of the present disclosure. In the specification, the schematic representation of the above terms does not necessarily refer to the same embodiment or example. Moreover, the particular features, structures, materials or characteristics described may be combined in a suitable manner in any one or more embodiments or examples.

What is claimed is:

1. A radio frequency detecting method configured to be used by a radio frequency detecting device, wherein the radio frequency detecting device comprises:
    a signal transmitting device, configured to sequentially generate and transmit multiple forward frequency detecting signals of different frequencies;
    a signal receiver, configured to receive multiple reverse frequency detecting signals reflected by a load;
    a first detection device, connected to the signal transmitting device, the first detection device configured to detect each first parameter corresponding to each of the multiple forward frequency detecting signals;
    a second detection device, connected to the signal receiver, the second detection device configured to detect each second parameter of each of the reverse frequency detecting signals; and
    a microcontroller, configured to control the signal transmitting device to generate the multiple forward frequency detecting signals of different frequencies, the microcontroller is further configured to determine a state parameter of the load based on the multiple frequencies and the first parameter and the second parameter corresponding to each of the multiple frequencies;
    wherein the method comprises:
    the signal transmitting device sequentially generates multiple forward frequency detecting signals of different frequencies based on the control signals sent by the microcontroller;
    transmitting the multiple forward frequency detecting signals to the load by the signal transmitting device, and detecting each first parameter corresponding to each of the multiple forward frequency detecting signals by the first detection device;
    receiving multiple reverse frequency detecting signals reflected by the load via the signal receiver, and detecting each second parameter of each of the reverse frequency detecting signals via the second detection device; and
    determining the state parameter of the load based on the multiple frequencies and the first parameter and the second parameter corresponding to each of the frequencies via the microcontroller;
    wherein determining the state parameter of the load comprises:
    determining a standing wave corresponding to each of the frequencies based on the first parameter and the second parameter corresponding to each of the frequencies;
    determining a frequency-standing wave relationship map based on the multiple frequencies and the standing wave corresponding to each of the frequencies;
    comparing the frequency-standing wave relationship map with a pre-stored map associated with the state parameter of the load;
    determining a preset map corresponding to the frequency-standing wave relationship map; and
    determining the state parameter of the load based on the preset map.

2. The radio frequency detecting method according to claim 1, wherein the signal transmitting device comprises:
    a signal generation component, configured to generate the multiple forward frequency detecting signals; and
    a signal transmitter, configured to transmit the multiple forward frequency detecting signals.

3. The radio frequency detecting method according to claim 2, wherein the signal transmitter and the signal receiver share a same antenna;
    the radio frequency detecting device further comprises:
    a power separation device, connected to the signal generation component, an antenna, the first detection device, and the second detection device,
    wherein a first terminal of the power separation device is connected to the antenna, a second terminal of the power separation device is connected to the first detection device, a third terminal of the power separation device is connected to the second detection device, and a fourth terminal of the power separation device is connected to the signal generation component.

4. The radio frequency detecting method according to claim 3, wherein the radio frequency detecting device further comprises:
    a power amplification device is disposed between the fourth terminal of the power separation device and the signal generation component, the fourth terminal is connected to the signal generation component via the power amplification device,
    wherein the power amplification device is configured to amplify the multiple forward frequency detecting signals.

5. The radio frequency detecting method according to claim 4, wherein the power amplification device comprises:
    a first capacitor, a first end of which is connected to the signal generation device;
    an amplifier, a first end of which is connected to a second end of the first capacitor; and
    a second capacitor, a first end of which is connected to a second end of the amplifier, and a second end of the second capacitor is connected to the fourth terminal of the power separation device.

* * * * *